United States Patent
Gendler et al.

(10) Patent No.: US 9,678,807 B2
(45) Date of Patent: Jun. 13, 2017

(54) HYBRID THREADING

(71) Applicant: Intel Corporation, Santa Clara, CA (US)

(72) Inventors: Alexander Gendler, Kiriat Motzkin (IL); Lihu Rappoport, Haifa (IL)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 14/107,149

(22) Filed: Dec. 16, 2013

(65) Prior Publication Data

US 2015/0169365 A1 Jun. 18, 2015

(51) Int. Cl.
*G06F 9/50* (2006.01)
*G06F 1/32* (2006.01)

(52) U.S. Cl.
CPC ............ *G06F 9/5094* (2013.01); *G06F 1/324* (2013.01); *G06F 1/329* (2013.01); *G06F 1/3293* (2013.01); *Y02B 60/121* (2013.01); *Y02B 60/1217* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 5,664,165 | A * | 9/1997 | Curry | G06F 1/12 713/501 |
| 7,139,921 | B2 * | 11/2006 | Sherburne, Jr. | G06F 1/3203 712/E9.032 |
| 7,673,166 | B2 * | 3/2010 | Liu et al. | 713/503 |
| 2002/0095610 | A1 * | 7/2002 | Nunomura | 713/322 |
| 2009/0055826 | A1 * | 2/2009 | Bernstein et al. | 718/102 |
| 2009/0089595 | A1 * | 4/2009 | Brey et al. | 713/300 |
| 2013/0138977 | A1 * | 5/2013 | Herman | G06F 1/3206 713/300 |

* cited by examiner

*Primary Examiner* — Kim Huynh
*Assistant Examiner* — Paul J Yen
(74) *Attorney, Agent, or Firm* — Lowenstein Sandler LLP

(57) ABSTRACT

Hybrid threading in a processor is described. An integrated circuit that implements hybrid threading includes a power control unit (PCU), a first functional hardware unit coupled to the PCU, and a second functional hardware unit coupled to the PCU. The first functional hardware unit and the second functional hardware unit are heterogeneous functional hardware units. The PCU is configured to monitor at least one power attribute of the first and second functional hardware units. The PCU is further configured to calculate an aggregate power value based on the monitored at least one power attribute. Upon determining that the aggregate power value is below a power threshold, the PCU is also configured to calculate a first frequency for the first functional hardware unit and a second frequency for the second functional hardware unit that results in an updated aggregate power value that is closer to the power threshold.

19 Claims, 11 Drawing Sheets

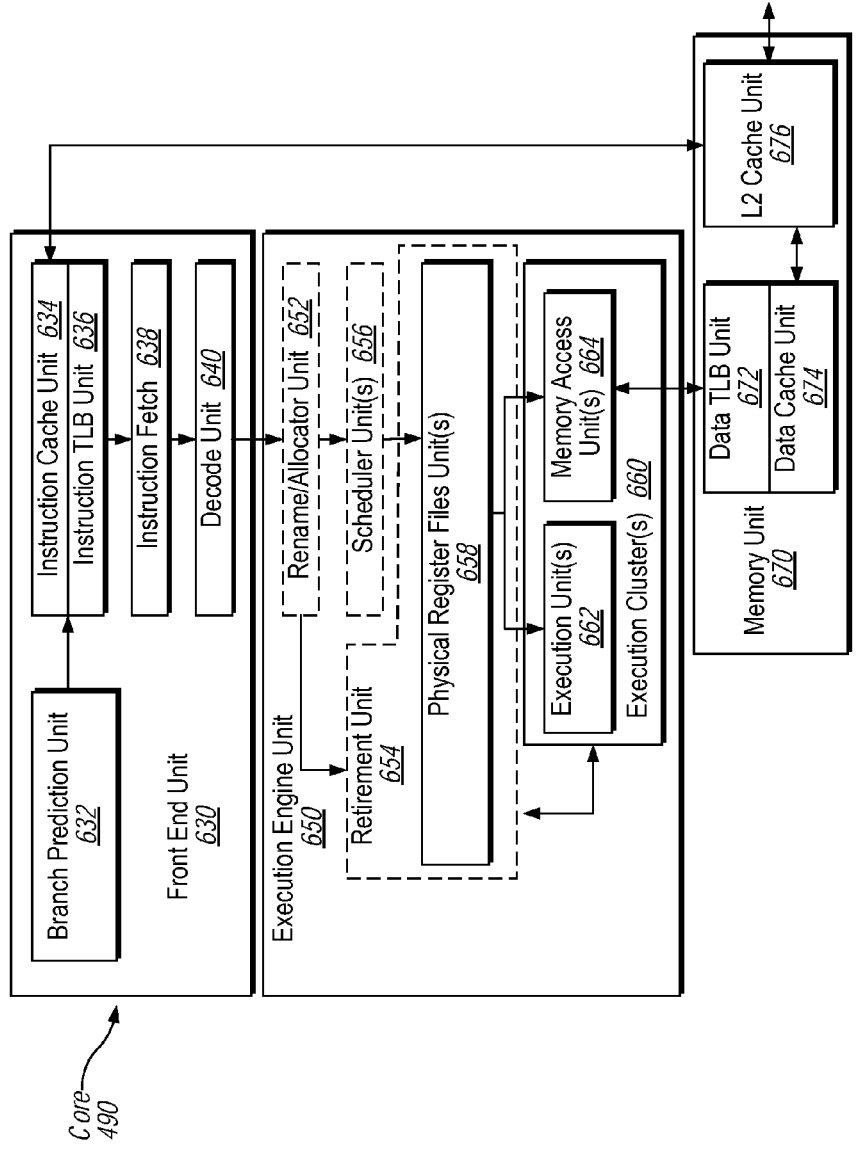

HYBRID THREADING

The present disclosure generally relates to processing systems and, more specifically, relates to hybrid threading techniques for integrated circuits having multiple functional units.

BACKGROUND

Modern processors include multiple instances of processor cores that can be turned on or off independently as directed by a Power Control Unit (PCU). A multi-core processor, for example, is a single computing component with two or more independent actual central processing units (also referred to as "functional units," "cores" or "processor cores"), which are the units that read and execute program instructions. The instructions are typically CPU instructions, but multiple cores can run multiple instructions at the same time, increasing overall speed for programs amenable to parallel computing. Manufacturers typically integrate the cores onto a single integrated circuit die, or onto multiple dies in a single package. A dual-core processor has two cores, a quad-core processor has four cores, and so on. Homogenous multi-core systems include only identical cores, and heterogeneous multi-core systems have cores that are not identical. Cores on conventional heterogeneous multi-core systems operate at the same frequency.

BRIEF DESCRIPTION OF THE DRAWINGS

The present disclosure is illustrated by way of examples, and not by way of limitation, and may be more fully understood with references to the following detailed description when considered in connection with the figures.

FIG. 6A illustrates elements of a processor micro-architecture according to implementations.

FIG. 6B illustrates elements of a processor micro-architecture according to implementations.

DETAILED DESCRIPTION

Figure 1:
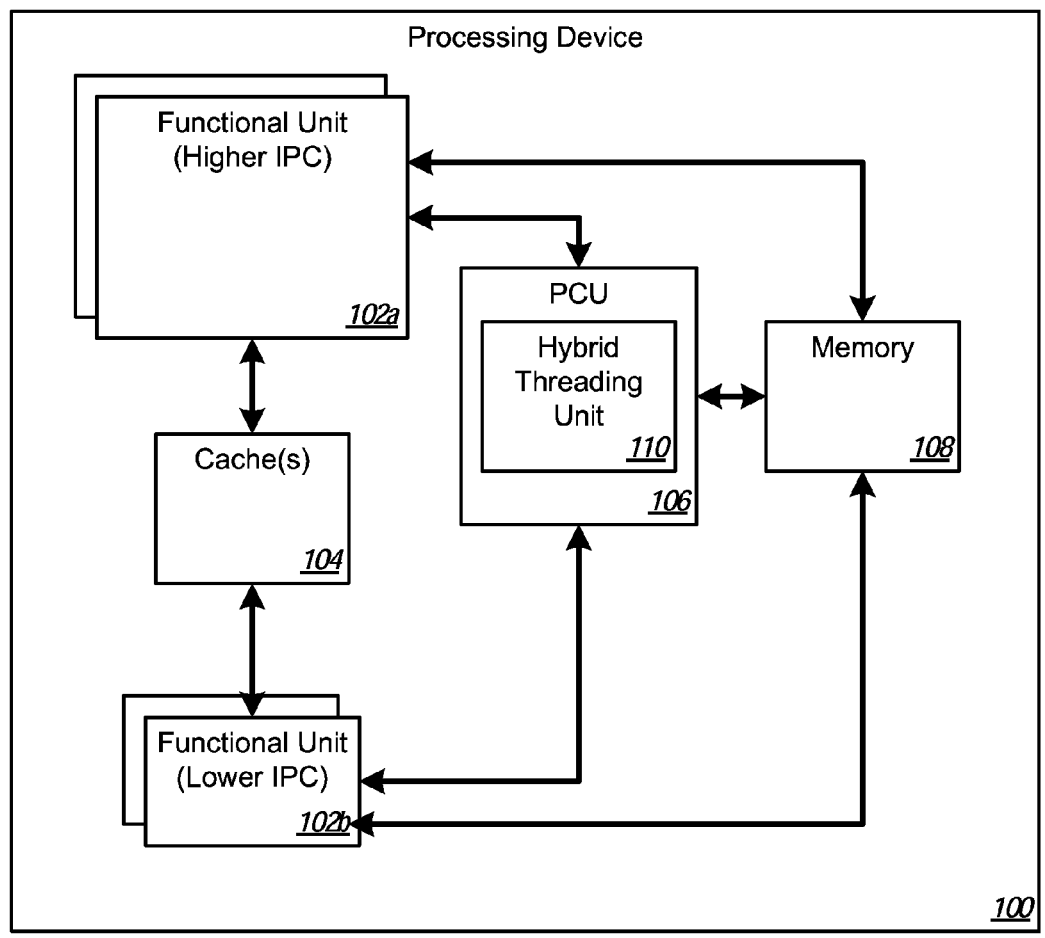
FIG. 1 is a block diagram illustrating a processing device that implements hybrid threading for multiple functional hardware units according to embodiments.

The present disclosure relates to computer systems, and related methods for managing hybrid threading among processor cores. "Core" herein shall refer to an execution resource (e.g., a functional unit) for executing a single thread. According to this definition, a two-way multi-threading core should be referred to as two cores. "Thread" herein shall include a process executable by a core.

Conventional computer architecture can include heterogeneous multi-core systems with cores that are not identical. Cores on these conventional heterogeneous multi-core systems, however, operate at the same frequency. With conventional processors, performance and power conservation are often in tension with each other. Some multi-core systems have large cores and focus on performance at the expense of efficiency. Other multi-core systems have small cores that have less performance because they focus more on power efficiency. For increased processing performance, conventional techniques include adding more cores, which increases the amount of power such systems will consume.

The embodiments described herein enable processors to use hybrid threading to achieve higher performance while using the same or lower power than conventional systems. An integrated circuit that implements hybrid threading includes a power control unit (PCU), a first functional hardware unit coupled to the PCU, and a second functional hardware unit coupled to the PCU. The first functional hardware unit and the second functional hardware unit are heterogeneous functional hardware units. The PCU is configured to monitor at least one power attribute of the first and second functional hardware units. The PCU is further configured to calculate an aggregate power value based on the monitored at least one power attribute. Upon determining that the aggregate power value is below a power threshold, the PCU is also configured to calculate a first frequency for the first functional hardware unit and calculate a second frequency for the second functional hardware unit that results in an updated aggregate power value that is closer to the power threshold.

Power control in the processor can lead to enhanced power savings. For example, the PCU can dynamically allocate power, frequency and/or voltage for functional units of the processor. Multiple deep low-power states can be provided to enable very low power consumption. In addition, dynamic control of the functional units or independent functional unit portions can provide for reduced power consumption by powering off components when they are not being used. Moreover, functional units can operate at different frequencies/voltages to increase performance within a power threshold. These implementations are also applicable to measuring performance metrics and automatic tuning for power efficiency. The implementations described herein can measure aggregate power consumption and use the measured power consumption to pick the highest performance and adjust frequencies within a power threshold for multiple functional units. For example, a processor can include a high-performance core that operates at a particular frequency (e.g., 2.97 GHz) and consumes a particular amount of power (e.g., 5 Watts). With same power budget of 5 Watts, the techniques described herein can achieve increased performance using multiple cores that can operate at different frequencies. Reducing the frequency of the high-performance core can reduce aggregate power consumption of the processor. The processor can also include a more energy-efficient core that consumes less power. Because the energy-efficient uses less power, its frequency can be increased, such as by 10-20%, to increase its performance. For example, when hybrid threading, the larger core can operate at 2.42 GHz and the smaller core can operate at 3.2 GHz and the aggregate power consumption of the larger core and the smaller core can be 5 Watts. The effect of decreasing the frequency of the high-performance core and increasing the frequency of the energy-efficient core can result in an increased overall performance as compared to the high-performance core that multithreads by itself at the original (e.g., not reduced) frequency.

The embodiments described herein can be used for continuous automatic tuning of processor cores. The mechanism can be used to identify and use an optimal hardware (HW) configuration. Tunable processor parameters (e.g., frequency, voltage) can be set at manufacturing, at system boot time or at runtime, and can be set to be compatible with a wide variety of applications.

FIG. 1 is a block diagram illustrating a processing device 100 that implements a hybrid threading unit 110 and multiple functional hardware units 102. In one embodiment, the processing device 100 is integrated in a single integrated circuit die having multiple hardware functional units 102 (hereafter referred to as a multi-core system). The multi-core system may be a multi-core processor package, but may include other types of functional units than just processor cores. Functional hardware units 102 may be processor cores, graphics cores (also referred to as graphics units), voltage regulator (VR) phases, input/output (I/O) interfaces (e.g., serial links, DDR memory channels) and their controllers, network controllers, fabric controllers, or any combination thereof. Functional units 102 may or may not share cache(s) 104, and they may implement message passing or shared memory inter-core communication methods. Heterogeneous multi-core systems have cores that are not identical or disparate functional units. For example, a first functional unit 102a can have a first performance metric (e.g., can handle a first number of instructions within a time period) and a second functional unit 102b can have a second performance metric (e.g., can handle a second number of instructions within the time period). In some implementations, the functional units 102 can be different sizes, have different structures, architecture, or the like. Just as with single-processor systems, cores in multi-core systems may implement architectures such as superscalar, multithreading, vector processing, or the like. The processing device 100 can be a multi-core system, which is a single computing component with multiple independent central processing units (CPUs), which are functional units 102 that read and execute program instructions. The multi-core system implements multiprocessing in a single physical package. Implementations described herein are described in the context of an example multi-core system including multiple processor cores with different performance metrics for simplicity of description.

The functional units 102 can include logic to perform algorithms for processing data, in accordance with implementations described herein. Functional units 102, including logic to perform integer and floating point operations, also resides in the processing device 100. The functional units 102 may or may not have a floating point unit. The processing device 100, in one embodiment, includes a microcode (ucode) ROM to store microcode, which when executed, is to perform algorithms for certain macroinstructions or handle complex scenarios. Microcode is potentially updateable to handle logic bugs/fixes for processing device 100. Alternate embodiments of a functional units 102 may also be used in micro controllers, embedded processors, graphics devices, DSPs, and other types of logic circuits. As the term is used herein, the functional units 102 can refer to a logical processor, thread, hyperthread, core, etc. The processing device 100 can have multiple functional units to handle multiple transactions.

The processing device 100 also includes a power control unit (PCU) 106 that implements the hybrid threading unit 110, some embodiments of which are described in more detail below. The PCU 106 may include registers and may interact with a non-volatile memory (NVM) device, which may be integrated into the same package as the PCU 106 or may be available on the same platform as the processing device 100, but not on the same package. The NVM device is computer memory that can retain the stored information even when not powered. Examples of NVM include read-only memory, flash memory, hard disks, or the like. The processing device 100 may also include volatile memory, such as in the form of random access memory (RAM) or registers. In one embodiment, the hybrid threading unit 110 uses registers to store measured power attributes as described herein. Alternatively, the hybrid threading unit 110 may store the power attributes in NVM, which may be on the same package as the PCU 106, or on a platform as described herein.

The PCU 106 controls power functions of the functional units 102. The PCU 106 may be an on-die microcontroller that has similar components to a computer, including firmware, software, memory, a CPU, I/O functions, timers, as well as analog-to-digital converters to receive measurements from sensors of the functional units 102. In one embodiment, the PCU 106 executes code, referred to as pcode, to implement the hybrid threading unit 110. Alternatively, the hybrid threading unit 110 can be implemented as hardware (e.g., circuitry, dedicated logic, programmable logic, microcode, etc.), firmware, software or any combination of the above. The PCU 106 may have its own embedded firmware and can measure inputs on temperature, current, frequency, power, energy, as well as operating system (OS) requests. The PCU 106 can be used to independently clock the functional units 102. In one embodiment, the PCU 106 receives input from each of the functional units 102 and determines an operating voltage and an operating frequency for each of the functional units 102. The PCU 106 can also monitor OS performance state requests to be able to make decisions about what power/performance state to enter.

In implementations, the hybrid threading unit 110 monitors power attributes of the functional units 102 and calculates individual power and aggregate power of the functional units 102 based on the monitored power attributes. Using the monitored power attributes, the hybrid threading unit 110 calculates a frequency for each of functional hardware units that results in an updated aggregate power value that is closer to a power threshold (e.g., a power budget). Additional details of some embodiments of the hybrid threading unit 110 are described below with respect to FIG. 2.

In some embodiments, the hybrid threading unit 110 communicates with a BIOS of the processing device 100 to identify the functional units 102, as well as to perform hybrid threading actions to maximize performance of the functional units within a power threshold, as described in more detail below with respect to FIG. 2.

In another embodiment, the PCU 106 is integrated on a second integrated circuit die that is separate from the integrated circuit die on which the functional units 102 reside.

The components of FIG. 1 can reside on "a common carrier substrate," such as, for example, an integrated circuit ("IC") die substrate, a multi-chip module substrate or the like. Alternatively, the processing device 100 may reside on one or more printed circuit boards, such as, for example, a mother board, a daughter board or other type of circuit card. In other implementations, the main memory and the processing device 100 can reside on the same or different carrier substrates. In other implementations, an NVM and the processing device 100 can reside on the same or different carrier substrates.

Processing device 100 includes a memory 108. Memory 108 includes any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), or other storage or memory device. The memory 108 can be byte-addressable. Memory 108 stores instructions and/or data represented by data signals that are to be executed by the processing device 101. The processing device 100 is coupled to the memory 108 via a processor bus (not shown). In some implementations, the memory 108 is a dual-inline memory module (DIMM). In an example, the processing device 100 includes 1 TB of total memory—four DIMMS, each with 256 GB of capacity. The memory 108 can include a NVM controller to interface between a memory controller and with NVM media. The NVM controller manages modifications (e.g., reads, writes, commits) to the NVM media.

For another embodiment of a processing device 100, the hybrid threading unit 110 can be used with a system on a chip. One embodiment of a system on a chip comprises a processing device and a memory. The memory for one such system is a persistent or non-volatile memory. The persistent or non-volatile memory can be located on the same die as the processor and other system components. Additionally, other logic blocks such as a memory controller or graphics controller can also be located on a system on a chip.

In implementations, an integrated circuit includes a power control unit (PCU), a first functional hardware unit coupled to the power control unit, and a second functional hardware unit coupled to the power control unit, where the first functional hardware unit and the second functional hardware unit are heterogeneous functional hardware units, where the PCU is configured to monitor a frequency and/or voltage of either the first functional hardware unit or second functional hardware unit. In some implementations, the PCU can monitor a frequency and/or voltage of both the first functional hardware unit and second functional hardware unit.

The PCU can calculate an aggregate power value based on the monitored at least one power attribute, frequency and/or voltage. Upon determining that the aggregate power value is below a power threshold, the PCU can calculate a first frequency for the first functional hardware unit and calculate a second frequency for the second functional hardware unit that results in an updated aggregate power value that is closer to the power threshold. The PCU can continually calculate these first and second frequencies to discover a highest performing combination of frequencies within the power threshold.

Figure 2:
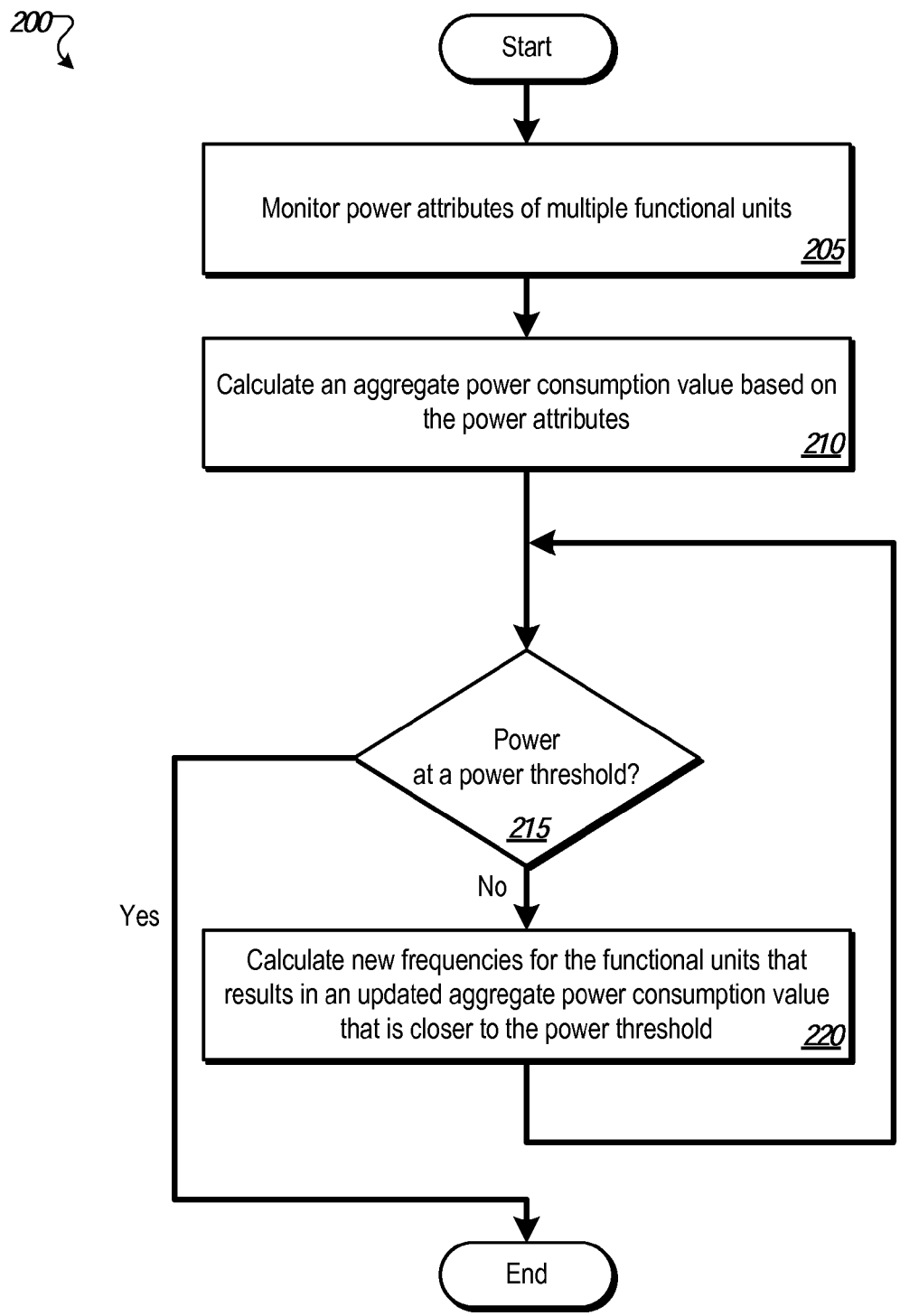
FIG. 2 illustrates a method for hybrid threading according to implementations.

FIG. 2 illustrates a method for performing hybrid threading according to implementations. Method 200 may be performed by processing logic that may comprise hardware (e.g., circuitry, dedicated logic, programmable logic, microcode, etc.), software (such as operations being performed by a functional unit), firmware or a combination thereof. In implementations, method 200 is performed by a processor and more specifically PCU 106 of FIG. 1. In other implementations, the method 200 is performed by hybrid threading unit 110 of FIG. 1. Alternatively, other components of the processing device 100 may perform some or all of the operations of the method 200.

Referring to FIG. 2, the method 200 begins at block 205 by processing logic monitoring at least one power attribute of a first and a second functional unit. The first functional unit and the second functional unit can be heterogeneous functional units that are not identical. For example, the first functional unit can be larger in size and performance than the second functional unit. The monitored power attribute may be any metrics, such as a power metric or energy metric. For example, the processing logic can measure a maximum power consumption of a functional unit or a cumulative energy consumption of a functional unit. Power is an instantaneous quantity, whereas energy is the cumulative power consumption, e.g., energy can be power consumption added over time. For example, in one embodiment, the metric is a power (or energy) metric, such as power (energy) consumption or the like. The processing logic calculates a power-consumption (energy-consumption) metric for the functional unit based on tracked power measurements. The processing logic determines if the power-consumption (or energy-consumption) metric exceeds a lowest power-consumption (or energy-consumption) metric, and assigns the power-consumption metric as the lowest power-consumption (or energy consumption) metric when the power-consumption (energy consumption) metric exceeds than the lowest power-consumption metric.

At block 210, the processing logic calculates an aggregate power value based on the monitored at least one power attribute. For example, when the processing logic monitors power of multiple functional units in a hybrid configuration, the processing logic can calculate a power for each of the functional units. In implementations, the processing logic can calculate a frequency ratio for the functional units using the following methodology. For purposes of illustration and for simplicity, two functional units (unit A and unit B) are described, but it should be noted that any number and configuration of different functional units is contemplated. Assuming that the performance of the two functional units A and B should be equal, as in:

Performance$_A$=Performance$_B$.

The performance of each unit can be determined by

Performance=IPC×f, where IPC is a number of instructions-per-cycle and f is frequency of the functional unit.

A frequency ratio of the two units A and B can be determined using these two equations, as in:

$$IPC_A \times f_A = IPC_B \times f_B$$

The frequency ratio is then:

$$\frac{f_A}{f_B} = \frac{IPC_B}{IPC_A}$$

The frequency ratio can be associated with a first number of instructions per cycle for unit A and a second number of instructions per cycle for the unit B. Next, the aggregate power value for each core can be calculated using the equation:

$$P = C \times f \times V^2,$$

where P=power, C=capacitance, f=frequency and V=voltage.

The processing logic can calculate the power for each core and add them to calculate the aggregate power of the system.

When the processing logic determines that the calculated aggregate power is below the power threshold at block 215, the processing logic calculates a different frequency for each of the units A and B that results in an updated aggregate power value that is closer to the power threshold. To calculate a different frequency for each of the units A and B, the processing logic can use an equation that sets the aggregate power for all units (e.g., units A and B) as being equal to a power threshold. This can be represented by the equation:

$$P_A + P_B = P_{max},$$

where $P_A$ is the power of unit A, $P_B$ is the power of unit B, and $P_{max}$ is the power threshold.

Using the above two equations, the aggregate power of the system becomes equal to the power threshold.

$$(C_A \times f_A \times V_A^2) + (C_B \times f_B \times V_B^2) = P_{max}$$

The processing logic can use the calculated frequency ratio with the above power equation to solve for one or more frequencies and/or voltages that result in a power at or near the power threshold. The processing logic can calculate a different frequency for each of the functional units that results in an updated aggregate power value that is at or closer to the power threshold. The processing logic can continuously perform all or part of method 200 to tune the functional units by balancing the frequencies of the functional units according to the frequency ratio and within the power threshold.

In implementations, the calculated different frequencies for each of the functional units are to result in a same performance for each of the functional units. In some implementations, the power threshold can be the power of the highest performance functional unit when operating in a simultaneous multithreading (SMT) configuration.

In implementations, unit B is to handle fewer instructions per cycle than unit A. When calculating the different frequency for each of the units at block 220, the processing logic can calculate a maximum frequency for unit B. Once the maximum frequency of unit B is known, the processing logic can calculate a frequency for unit A. In some implementations, the frequency of the unit A is greater than 2.5 gigahertz. In implementations, frequency ratio between unit B and unit A is at least ten percent.

Figure 3:
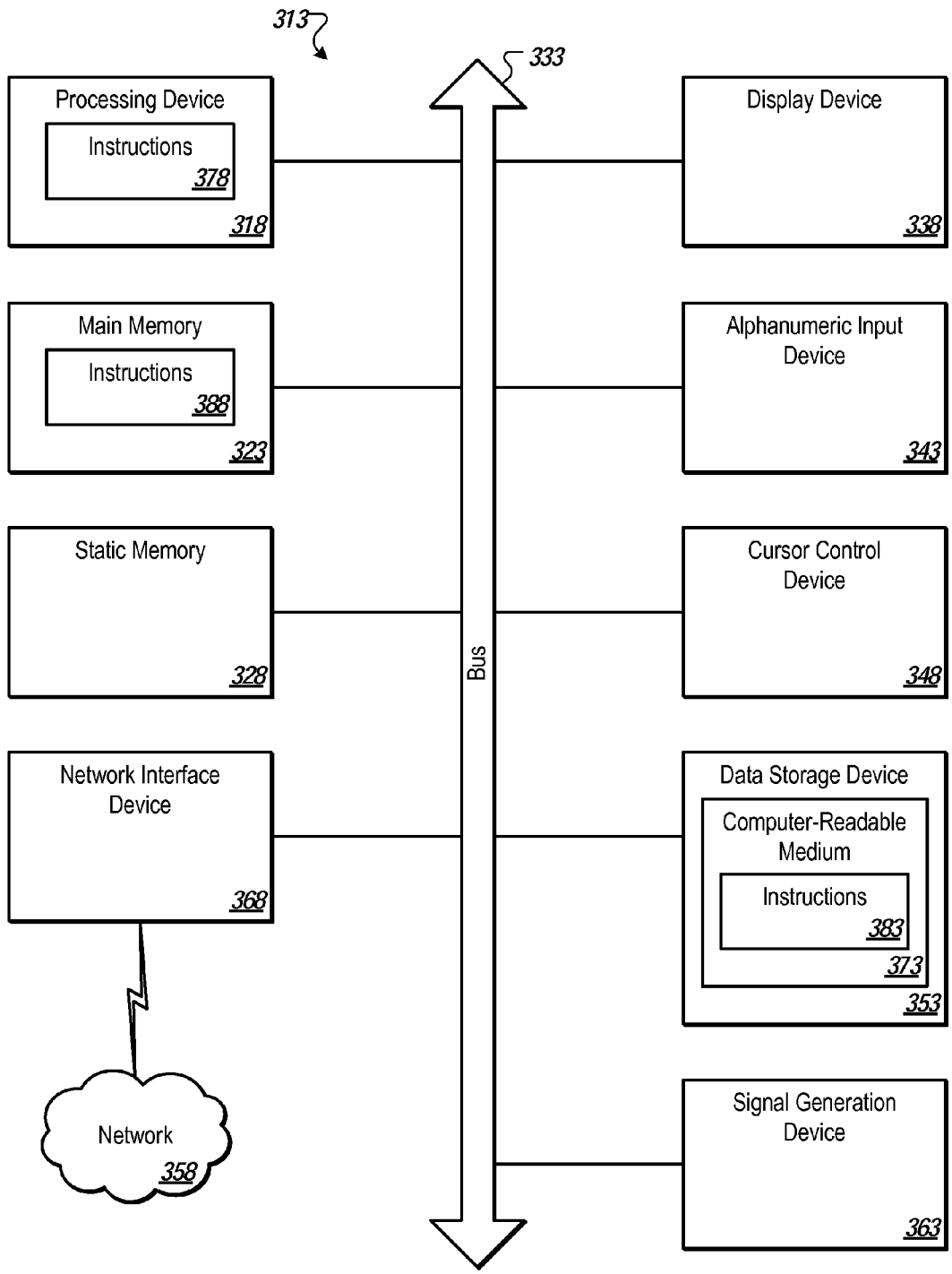
FIG. 3 illustrates a diagrammatic representation of a machine in the example form of a computing system according to implementations.

FIG. 3 illustrates a diagrammatic representation of a machine in the example form of a computing system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a game console, a cellular telephone, a digital camera, a handheld PC, a web appliance, a server, a network router, switch or bridge, micro controller, a digital signal processor (DSP), system on a chip, network computers (NetPC), network hubs, wide area network (WAN) switches, or any machine capable of executing a set of instructions (sequential or otherwise) that specify actions to be taken by that machine. Further, while only a single machine is illustrated for the processing device 100, the term "machine" shall also be taken to include any collection of machines that individually or jointly execute a set (or multiple sets) of instructions to perform any one or more of the methodologies discussed herein. Embodiments are not limited to computer systems.

The computing system 300 includes a processing device 302, main memory 304 (e.g., read-only memory (ROM), flash memory, dynamic random access memory (DRAM) (such as synchronous DRAM (SDRAM) or DRAM (RDRAM), etc.), a static memory 306 (e.g., flash memory, static random access memory (SRAM), etc.), and a data storage device 316, which communicate with each other via a bus 308.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. In one embodiment, processing device 302 may include one or processing cores. The processing device 302 is configured to execute the processing logic 326 for performing the operations discussed herein. In one embodiment, processing device 302 can be part of the processing device 100 of FIG. 1. Alternatively, the computing system 300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Computing system 300 is representative of processing systems based on the PENTIUM III™, PENTIUM 4™, Celeron™, Xeon™, Itanium, XScale™, StrongARM™, Core™, Core 2™, Atom™, and/or Intel® Architecture Core™, such as an i3, i5, i7 microprocessors available from Intel Corporation of Santa Clara, Calif., although other systems (including PCs having other microprocessors, engineering workstations, set-top boxes and the like) may also be used. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. In one embodiment, processing device 101 executes a version of the WINDOWS™ operating system available from Microsoft Corporation of Redmond, Wash., although other operating systems (OS X, UNIX, Linux, Android, iOS, Symbian, for example), embedded software, and/or graphical user interfaces, may also be used. Thus, embodiments of the present disclosure are not limited to any specific combination of hardware circuitry and software. One embodiment may be described in the context of a single processor desktop or server system, but alternative embodiments may be included in a multiprocessor system. Computing system 300 may be an example of a 'hub' system architecture.

The computing system 300 may further include a network interface device 322 communicably coupled to a network 318. The computing system 300 also may include a display device 310 (e.g., a liquid crystal display (LCD) or a cathode ray tube (CRT)), an alphanumeric input device 312 (e.g., a keyboard), a cursor control device 314 (e.g., a mouse), a signal generation device 320 (e.g., a speaker), or other peripheral devices. Furthermore, computing system 300 may include a graphics processing unit (not illustrated), a video processing unit (not illustrated) and an audio processing unit (not illustrated). In another embodiment, the computing system 300 may include a chipset (not illustrated), which refers to a group of integrated circuits, or chips, that are designed to work with the processing device 302 and controls communications between the processing device 302 and external devices. For example, the chipset may be a set of chips on a motherboard that links the processing device 302 to very high-speed devices, such as main memory 304 and graphic controllers, as well as linking the processing device 302 to lower-speed peripheral buses of peripherals, such as USB, PCI or ISA buses.

The data storage device 316 may include a computer-readable storage medium 324 on which is stored instructions 326 embodying any one or more of the methodologies of functions described herein. The instructions 326 may also reside, completely or at least partially, within the main memory 304 as instructions 326 and/or within the processing device 302 as processing logic 326 during execution thereof by the computing system 300; the main memory 304 and the processing device 302 also constituting computer-readable storage media.

The computer-readable storage medium 324 may also be used to store instructions 326 utilizing the processing device 302, such as described with respect to FIG. 1, and/or a software library containing methods that call the above applications. While the computer-readable storage medium 324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 4:
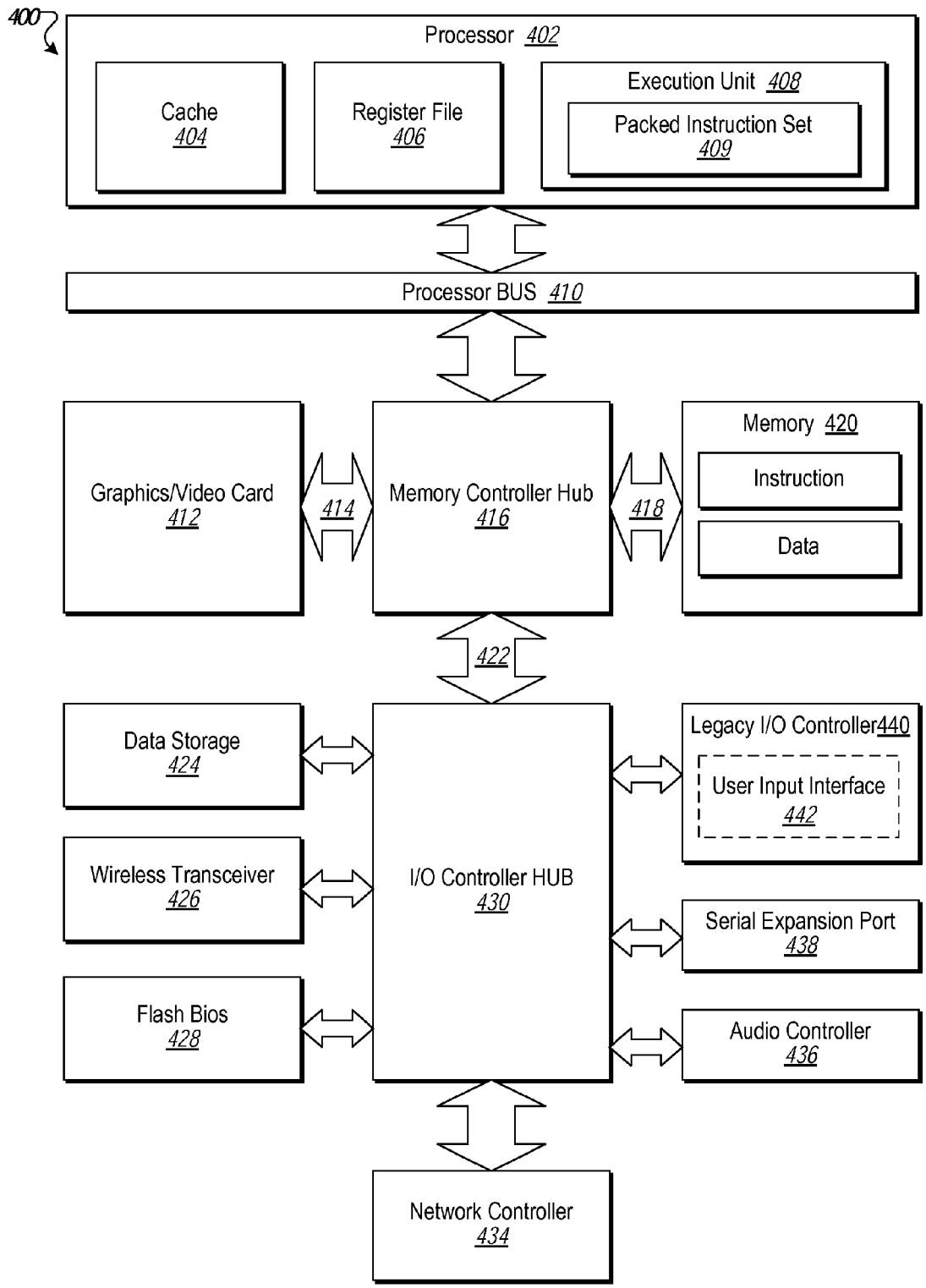
FIG. 4 is a block diagram of an exemplary computer system according to implementations.

Turning to FIG. 4, a block diagram of an example computer system formed with a processor that includes execution units to execute an instruction, where one or more of the interconnects implement one or more features in accordance with one embodiment of the present disclosure is illustrated. System 400 includes a component, such as a processor 402 to employ execution units including logic to perform algorithms for processing data, in accordance with the embodiment described herein. Embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 402 includes one or more execution units 408 to implement an algorithm that is to perform at least one instruction. One embodiment may be described in the context of a single processor desktop or server system, but alternative embodiments may be included in a multiprocessor system. System 400 is an example of a 'hub' system architecture. The computer system 400 includes a processor 402 to process data signals. The processor 402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 402 is coupled to a processor bus 410 that transmits data signals between the processor 402 and other components in the system 400. The elements of system 400 (e.g. graphics accelerator 412, memory controller hub 416, memory 420, I/O controller hub 424, wireless transceiver 426, Flash BIOS 428, Network controller 434, Audio controller 436, Serial expansion port 438, I/O controller 430, etc.) perform their conventional functions that are well known to those familiar with the art.

In one embodiment, the processor 402 includes a Level 1 (L1) internal cache memory 404. Depending on the architecture, the processor 402 may have a single internal cache or multiple levels of internal caches. Other embodiments include a combination of both internal and external caches depending on the particular implementation and needs. Register file 406 is to store different types of data in various registers including integer registers, floating point registers, vector registers, banked registers, shadow registers, checkpoint registers, status registers, and instruction pointer register.

Execution unit 408, including logic to perform integer and floating point operations, also resides in the processor 402. The processor 402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 402. For one embodiment, execution unit 408 includes logic to handle a packed instruction set 409. By including the packed instruction set 409 in the instruction set of a general-purpose processor 402, along with associated circuitry to execute the instructions, the operations used by many multimedia applications may be performed using packed data in a general-purpose processor 402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 408 may also be used in micro controllers, embedded processors, graphics devices, DSPs, and other types of logic circuits. System 400 includes a memory 420. Memory 420 includes a dynamic random access memory (DRAM) device, a static random access memory (SRAM) device, flash memory device, or other memory device. Memory 420 stores instructions and/or data represented by data signals that are to be executed by the processor 402.

A system logic chip 416 is coupled to the processor bus 410 and memory 420. The system logic chip 416 in the illustrated embodiment is a memory controller hub (MCH). The processor 402 can communicate to the MCH 416 via a processor bus 410. The MCH 416 provides a high bandwidth memory path 418 to memory 420 for instruction and data storage and for storage of graphics commands, data and textures. The MCH 416 is to direct data signals between the processor 402, memory 420, and other components in the system 400 and to bridge the data signals between processor bus 410, memory 420, and system I/O 422. In some embodiments, the system logic chip 416 can provide a graphics port for coupling to a graphics controller 412. The MCH 416 is coupled to memory 420 through a memory interface 418. The graphics card 412 is coupled to the MCH 416 through an Accelerated Graphics Port (AGP) interconnect 414.

System 400 can use a proprietary hub interface bus 422 to couple the MCH 416 to the I/O controller hub (ICH) 430. The ICH 430 provides direct connections to some I/O devices via a local I/O bus. The local I/O bus is a high-speed I/O bus for connecting peripherals to the memory 420, chipset, and processor 402. Some examples are the audio controller, firmware hub (flash BIOS) 428, wireless transceiver 426, data storage 424, legacy I/O controller containing user input and keyboard interfaces, a serial expansion port such as Universal Serial Bus (USB), and a network controller 434. The data storage device 424 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 5:
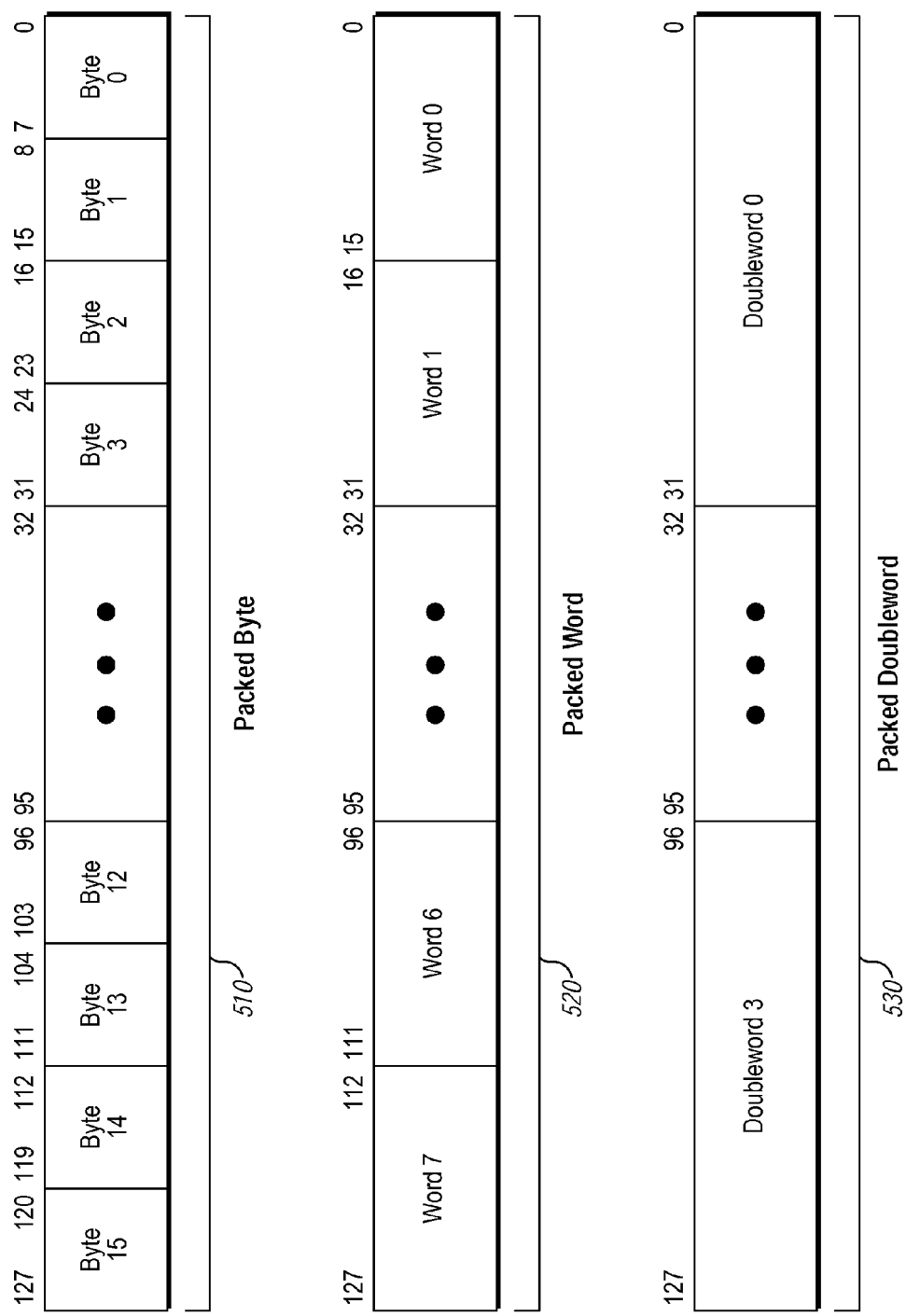
FIG. 5 illustrates packed data types according to implementations.

FIG. 5 illustrates various packed data type representations in multimedia registers according to one embodiment of the present disclosure. FIG. 5 illustrates data types for a packed byte 510, a packed word 520, and a packed doubleword (dword) 530 for 128 bits wide operands. The packed byte format 510 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 5 are 128 bit long, implementations can also operate with 64 bit wide or other sized operands. The packed word format 520 of this example is 128 bits long and contains eight packed word data elements. Each packed word contains sixteen bits of information. The packed doubleword format 530 of FIG. 5 is 128 bits long and contains four packed doubleword data elements. Each packed doubleword data element contains thirty two bits of information. A packed quadword is 128 bits long and contains two packed quad-word data elements.

FIG. 6A is a block diagram illustrating an in-order pipeline and a register renaming stage, out-of-order issue/execution pipeline according to at least one embodiment of the disclosure. FIG. 6B is a block diagram illustrating an in-order architecture core and a register renaming logic, out-of-order issue/execution logic to be included in a processor according to at least one embodiment of the disclosure. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 670.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 162 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory.

By way of example, the register renaming, out-of-order issue/execution core architecture may implement the pipeline 500 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

While register renaming is described in the context of out-of-order execution, it should be understood that register renaming may be used in an in-order architecture. While the illustrated embodiment of the processor also includes a separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
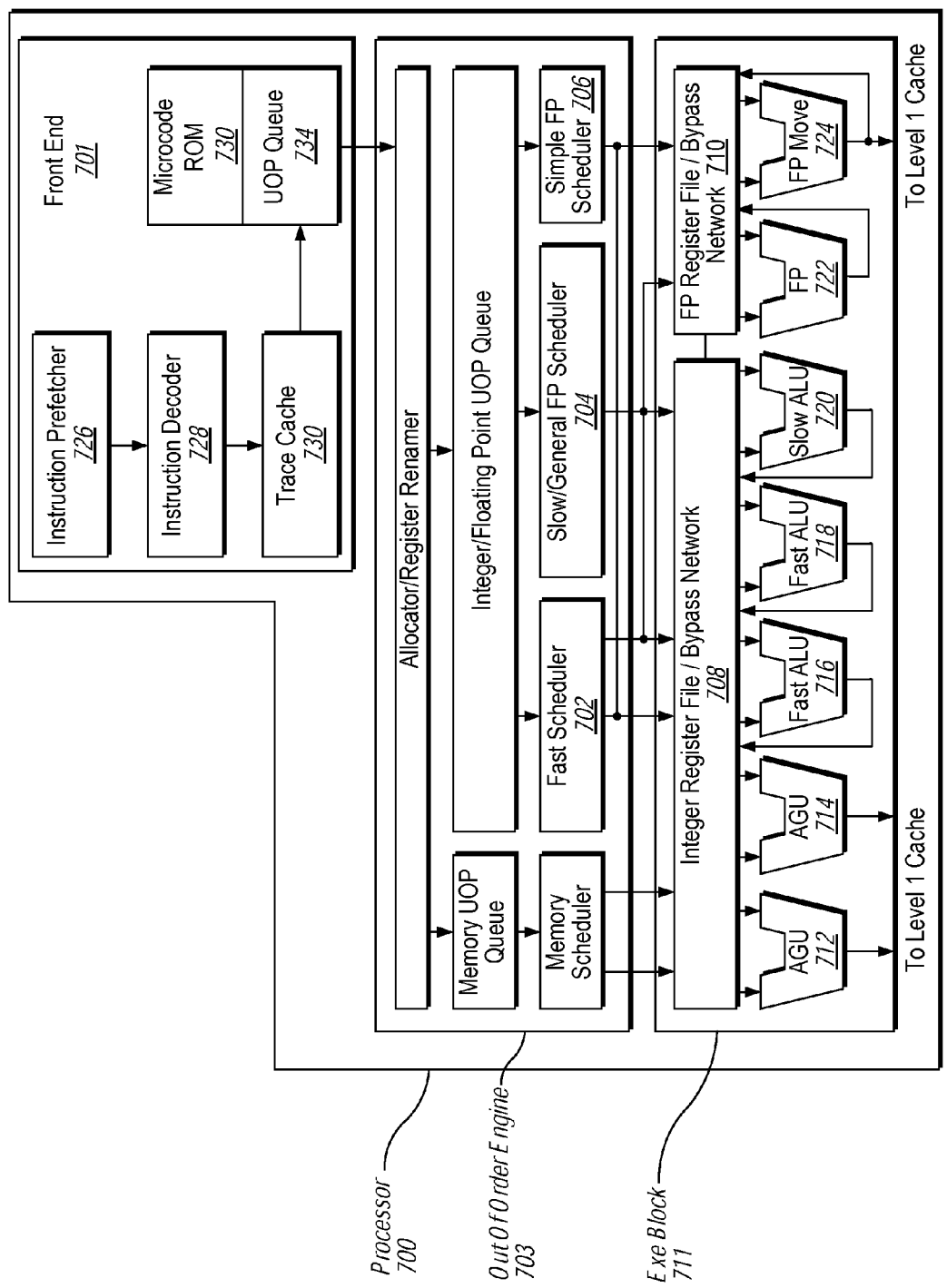
FIG. 7 is a block diagram of a processor according to implementations.

FIG. 7 is a block diagram of the micro-architecture for a processor 700 that includes logic circuits to perform instructions in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops need to complete their operation. The fast scheduler 702 of one embodiment can schedule on each half of the main clock cycle while the other schedulers can schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710 for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the present disclosure, instructions involving a floating point value may be handled with the floating point hardware. In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720 are described in the context of performing integer operations on 64 bit data operands. In alternative embodiments, the ALUs 716, 718, 720 can be implemented to support a variety of data bits including 16, 32, 128, 756, etc. Similarly, the floating point units 722, 724 can be implemented to support a range of operands having bits of various widths. For one embodiment, the floating point units 722, 724 can operate on 128 bits wide packed data operands in conjunction with SIMD and multimedia instructions.

In one embodiment, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
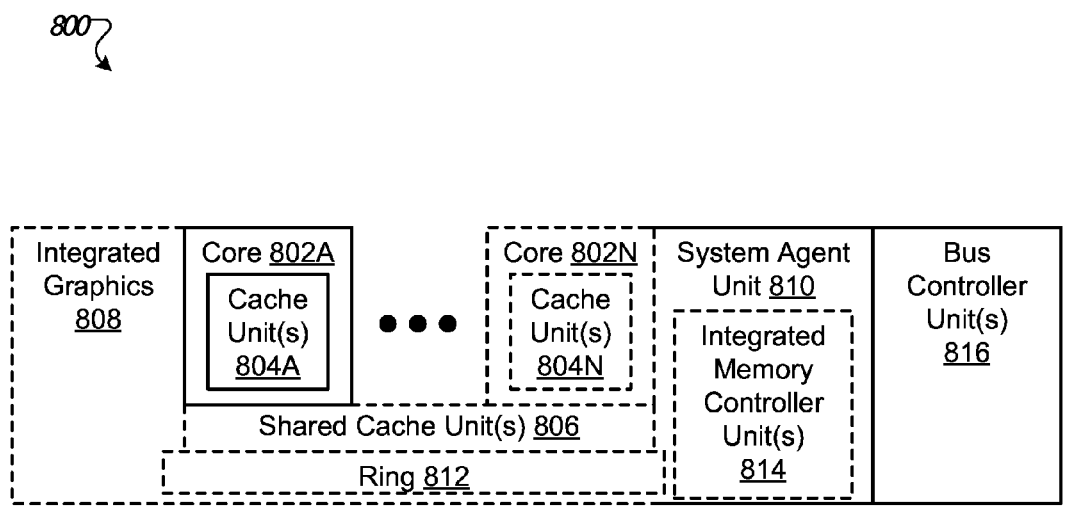
FIG. 8 is a block diagram of a processor according to implementations.

FIG. 8 is a block diagram of a single core processor and a multicore processor 800 with integrated memory controller and graphics according to embodiments of the disclosure. The solid lined boxes in FIG. 8 illustrate a processor 800 with a single core 802A, a system agent 810, a set of one or more bus controller units 816, while the addition of the dashed lined boxes illustrates an alternative processor 800 with multiple cores 802A-N, a set of one or more integrated memory controller unit(s) 814 in the system agent unit 810, and an integrated graphics logic 808.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810, alternative embodiments may use any number of well-known techniques for interconnecting such units.

In some implementations, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing a subset of that instruction set or a different instruction set. As a further example, the cores can be different architecture.

The processor may include one or more different general-purpose processors, such as a Core™ i3, i5, i7, 2 Duo and Quad, Xeon™, Itanium™, Atom™, XScale™ or StrongARM™ processor, which are available from Intel Corporation, of Santa Clara, Calif. For example, one core can be a Core i7™ core while another core of the processor can be an Atom™ core. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 800 may be a part of and/or may be implemented on one or more substrates using any of a number of process technologies, such as, for example, BiCMOS, CMOS, or NMOS.

Figure 9:
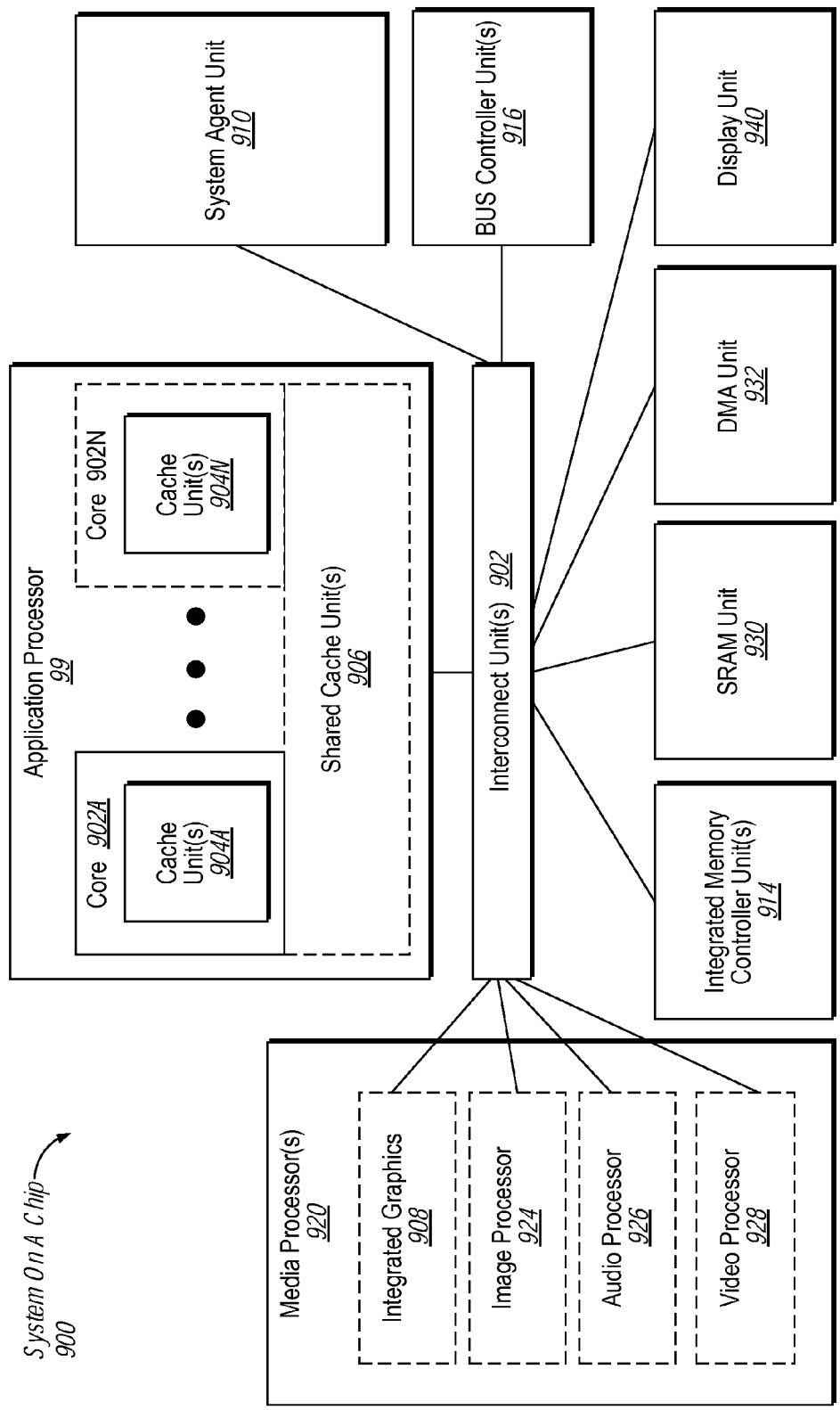
FIG. 9 is a block diagram of a system-on-a-chip according to implementations.

Referring now to FIG. 9, shown is a block diagram of a SoC 900 in accordance with an embodiment of the present disclosure. Similar elements in FIG. 9 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
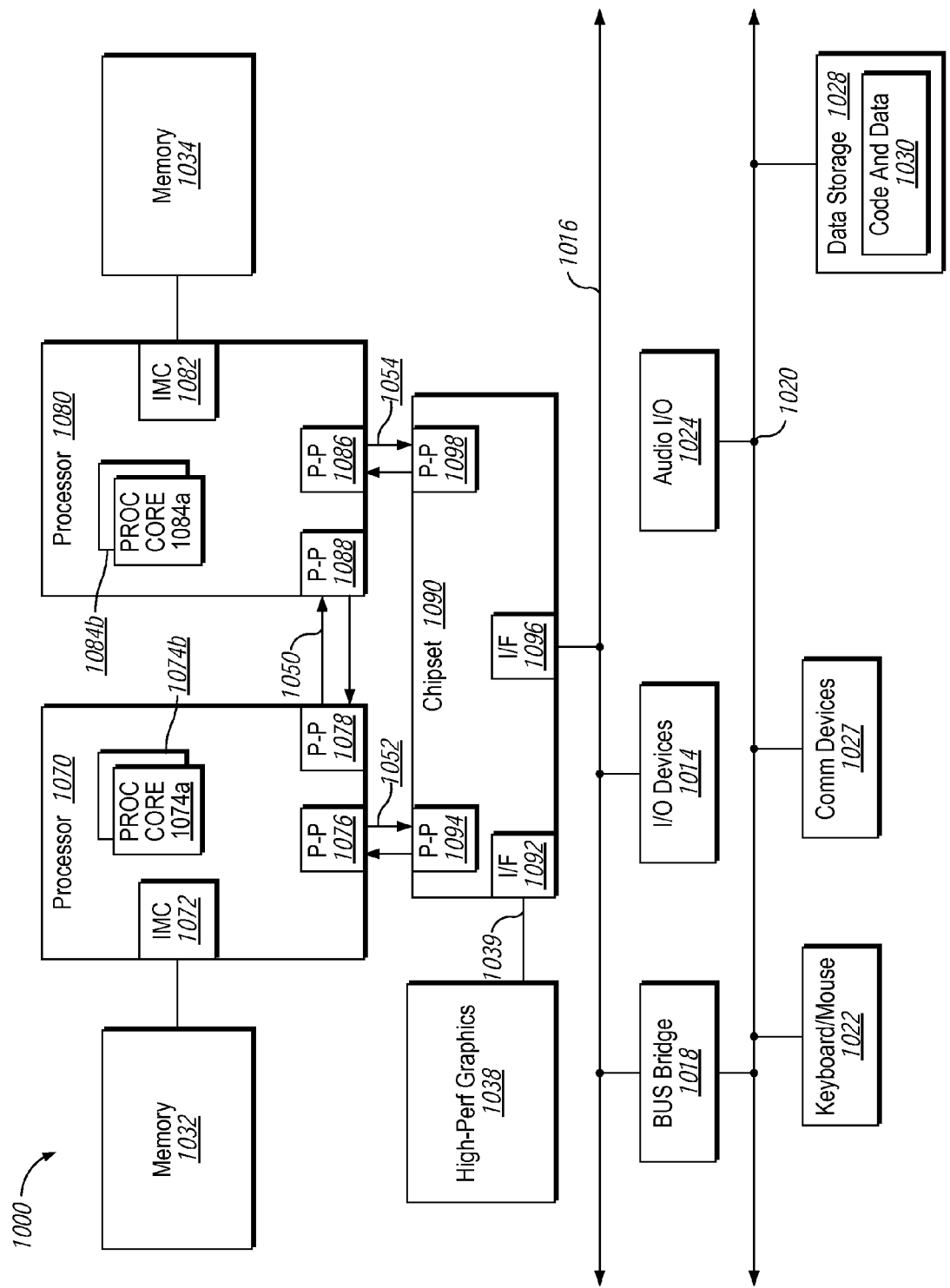
FIG. 10 is a block diagram of a computer system according to implementations.

Embodiments may be implemented in many different system types. Referring now to FIG. 10, shown is a block diagram of a multiprocessor system 1000 in accordance with an implementation. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. The processors each may include hybrid write mode logics in accordance with an embodiment of the present.

While shown with two processors 1070, 1080, it is to be understood that the scope of the present disclosure is not so limited. In other implementations, one or more additional processors may be present in a given processor.

Processors 1070 and 1080 are shown including integrated memory controller units 8102 and 8102, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
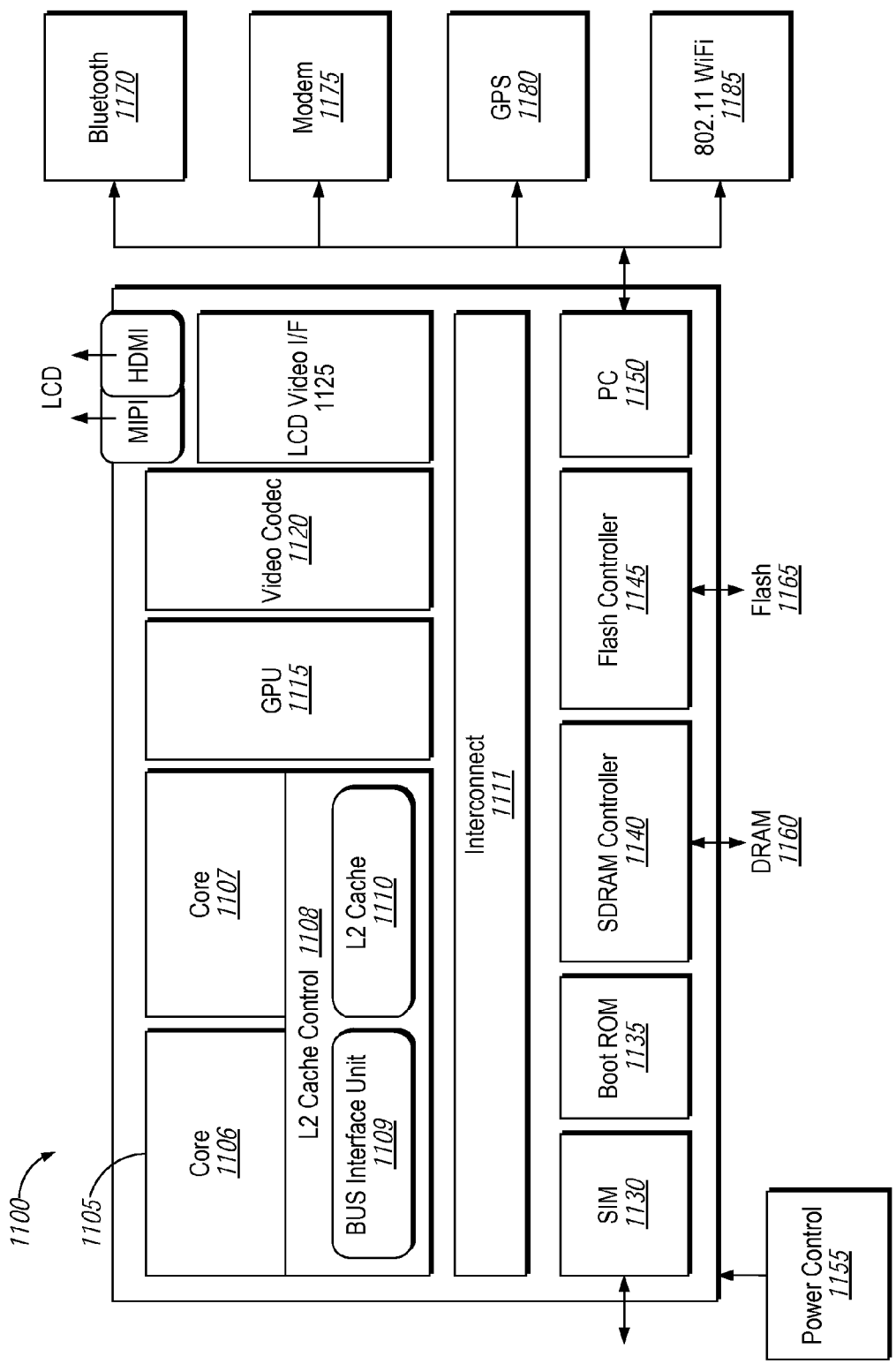
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with persistent or non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, modem 1175 (e.g., 3G, 4G, Long Term Evolution (LTE), LTE-Advanced, etc.), GPS 1180, Wi-Fi 1185, Zigbee (not shown), and Z-Wave (not shown). Note as stated above, a UE includes a radio for communication. As a result, these peripheral communication modules may not all be included. However, in a UE some form of a radio for external communication should be included.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to hybrid-threading in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to further embodiments.

Example 1 is an integrated circuit that includes a power control unit (PCU), a first functional hardware unit coupled to the power control unit, and a second functional hardware unit coupled to the power control unit, where the first functional hardware unit and the second functional hardware unit are heterogeneous functional hardware units, where the PCU is configured to monitor at least one power attribute of the first and second functional hardware units, calculate an aggregate power value based on the monitored at least one power attribute, and upon determining that the aggregate power value is below a power threshold, calculate a first frequency for the first functional hardware unit and calculate a second frequency for the second functional hardware unit that results in an updated aggregate power value that is closer to the power threshold.

In Example 2, the subject matter of Example 1, where the calculated first and second frequencies are to result in a same performance for the first functional hardware unit as a performance for the second functional hardware unit.

In Example 3, the subject matter of any one of Examples 1-2, where when calculating the first frequency for the first functional hardware unit and the second frequency for the second functional hardware unit, the PCU is to calculate a frequency ratio between the first frequency and the second frequency.

In Example 4, the subject matter of any one of Examples 1-3, where the frequency ratio is associated with a first number of instructions per cycle for the first functional hardware unit and a second number of instructions per cycle for the second functional hardware unit.

In Example 5, the subject matter of any one of Examples 1-4, where a first performance of the first functional hardware unit is the first frequency multiplied by a first number of instructions per a unit of time associated with the first functional hardware unit, where a second performance of the second functional hardware unit is the second frequency multiplied by a second number of instructions per a unit of time associated with the second functional hardware unit.

In Example 6, the subject matter of any one of Examples 1-5, where the at least one power attribute includes a frequency, voltage, energy, or power consumption.

In Example 7, the subject matter of any one of Examples 1-6, where the second functional hardware unit is to handle fewer instructions per cycle than the first functional hardware unit, and where when calculating the first and second frequency, the PCU is to calculate a maximum frequency for the second functional hardware unit.

In Example 8, the subject matter of any one of Examples 1-7, where the power threshold is a power metric of the first functional hardware unit when the first functional hardware unit is configured for simultaneous multi-threading.

In Example 9, the subject matter of any one of Examples 1-8, where the first frequency is greater than 2.5 gigahertz.

In Example 10, the subject matter of any one of Examples 1-9, where the second frequency is at least ten percent greater than the first frequency.

In Example 11, the subject matter of any one of Examples 1-10, where the first functional hardware unit and the second functional hardware unit are configurable to each simultaneously execute a plurality of threads.

Example 12 is a method including monitoring, by a power control unit (PCU), at least one power attribute of a first and a second functional hardware unit, where the first functional hardware unit and the second functional hardware unit are heterogeneous functional hardware units, calculating an aggregate power value based on the monitored at least one power attribute, and upon determining that the aggregate power value is below a power threshold, calculating a first frequency for the first functional hardware unit and calculate a second frequency for the second functional hardware unit that results in an updated aggregate power value that is closer to the power threshold.

In Example 13, the subject matter of Example 12, where the calculated first and second frequencies for each of the first functional hardware unit and the second functional hardware unit are to result in a same performance for the first functional hardware unit as a performance for the second functional hardware unit.

In Example 14, the subject matter of any one of Examples 12-13, where calculating a frequency for the first frequency for the first functional hardware unit and the second frequency for the second functional hardware unit includes calculating a frequency ratio between the first frequency and the second frequency.

In Example 15, the subject matter of any one of Examples 12-14, where the frequency ratio is associated with a first number of instructions per cycle for the first functional hardware unit and a second number of instructions per cycle for the second functional hardware unit.

In Example 16, the subject matter of any one of Examples 12-15, where a first performance of the first functional hardware unit is the first frequency multiplied by a first number of instructions per a unit of time associated with the first functional hardware unit, where a second performance of the second functional hardware unit is the second frequency multiplied by a second number of instructions per a unit of time associated with the second functional hardware unit.

In Example 17, the subject matter of any one of Examples 12-16, where the at least one power attribute includes a frequency, voltage, or power consumption.

In Example 18, the subject matter of any one of Examples 12-17, where the second functional hardware unit is to handle fewer instructions per cycle than the first functional hardware unit, where the calculating the first and second frequencies includes calculating a maximum frequency for the second functional hardware unit.

Example 19 is a non-transitory machine-readable storage medium including data that, when accessed by a processor, cause the processor to perform operations including monitoring, by a power control unit (PCU), at least one power attribute of a first and a second functional hardware unit, where the first functional hardware unit and the second functional hardware unit are heterogeneous functional hardware units, calculating an aggregate power value based on the monitored at least one power attribute, and upon determining that the aggregate power value is below a power threshold, calculating a first frequency for the first functional hardware unit and calculate a second frequency for the second functional hardware unit that results in an updated aggregate power value that is closer to the power threshold.

In Example 20, the subject matter of Examples 19, where the calculated first and second frequencies are to result in a same performance for the first functional hardware unit as a performance for the second functional hardware unit.

In Example 21, the subject matter of any one of Examples 19-20, where calculating a frequency for the first frequency for the first functional hardware unit and the second frequency for the second functional hardware unit includes calculating a frequency ratio between the first frequency and the second frequency.

In Example 22, the subject matter of any one of Examples 19-21, where the frequency ratio is associated with a first number of instructions per cycle for the first functional hardware unit and a second number of instructions per cycle for the second functional hardware unit.

In Example 23, the subject matter of any one of Examples 19-22, where a first performance of the first functional hardware unit is the first frequency multiplied by a first number of instructions per a unit of time associated with the first functional hardware unit, where a second performance of the second functional hardware unit is the second frequency multiplied by a second number of instructions per a unit of time associated with the second functional hardware unit.

In Example 24, the subject matter of any one of Examples 19-23, where the at least one power attribute includes a frequency, voltage, or power consumption.

In Example 25, the subject matter of any one of Examples 19-24, where the second functional hardware unit is to handle fewer instructions per cycle than the first functional hardware unit, where the calculating the first and second frequencies includes calculating a maximum frequency for the second functional hardware unit.

Example 26 is a machine-readable storage medium including data that, when executed by a processor, cause the processor to perform operations that include monitoring, by a power control unit (PCU), at least one power attribute of a first and a second functional hardware unit, where the first functional hardware unit and the second functional hardware unit are heterogeneous functional hardware units, calculating an aggregate power value based on the monitored at least one power attribute, and upon determining that the aggregate power value is below a power threshold, calculating a first frequency for the first functional hardware unit and a second frequency for the second functional hardware unit that results in an updated aggregate power value that is closer to the power threshold.

In Example 27, the subject matter of Example 26, where the calculated first and second frequencies are to result in a same performance for the first functional hardware unit as a performance for the second functional hardware unit.

In Example 28, the subject matter of any one of Examples 26-27, where calculating a frequency for the first frequency for the first functional hardware unit and the second frequency for the second functional hardware unit includes calculating a frequency ratio between the first frequency and the second frequency.

In Example 29, the subject matter of any one of Examples 26-28, where the frequency ratio is associated with a first number of instructions per cycle for the first functional hardware unit and a second number of instructions per cycle for the second functional hardware unit.

In Example 30, the subject matter of any one of Examples 26-29, where a first performance of the first functional hardware unit is the first frequency multiplied by a first number of instructions per a unit of time associated with the first functional hardware unit, where a second performance of the second functional hardware unit is the second frequency multiplied by a second number of instructions per a unit of time associated with the second functional hardware unit.

In Example 31, the subject matter of any one of Examples 26-30, where the at least one power attribute includes a frequency, voltage, or power consumption.

In Example 32, the subject matter of any one of Examples 26-31, where the second functional hardware unit is to handle fewer instructions per cycle than the first functional hardware unit, where the calculating the first and second frequency includes calculating a maximum frequency for the second functional hardware unit.

Example 33 is an apparatus including means for monitoring, by a power control unit (PCU), at least one power attribute of a first and a second functional hardware unit, where the first functional hardware unit and the second functional hardware unit are heterogeneous functional hardware units, means for calculating an aggregate power value based on the monitored at least one power attribute, and upon determining that the aggregate power value is below a power threshold, means for calculating a first frequency for the first functional hardware unit and a second frequency for the second functional hardware unit that results in an updated aggregate power value that is closer to the power threshold.

In Example 34, the subject matter of Example 33, where the calculated first and second frequencies are to result in a same performance for the first functional hardware unit as a performance for the second functional hardware unit.

In Example 35, the subject matter of any one of Examples 33-34, where the means for calculating a frequency for the first frequency for the first functional hardware unit and the second frequency for the second functional hardware unit includes means for calculating a frequency ratio between the first frequency and the second frequency.

In Example 36, the subject matter of any one of Examples 33-35, where the frequency ratio is associated with a first number of instructions per cycle for the first functional hardware unit and a second number of instructions per cycle for the second functional hardware unit.

In Example 37, the subject matter of any one of Examples 33-36, where a first performance of the first functional hardware unit is the first frequency multiplied by a first number of instructions per a unit of time associated with the first functional hardware unit, where a second performance of the second functional hardware unit is the second frequency multiplied by a second number of instructions per a unit of time associated with the second functional hardware unit.

In Example 38, the subject matter of any one of Examples 33-37, where the at least one power attribute includes a frequency, voltage, or power consumption.

In Example 39, the subject matter of any one of Examples 33-38, where the second functional hardware unit is to handle fewer instructions per cycle than the first functional hardware unit, where the means for calculating the first and second frequencies includes means for calculating a maximum frequency for the second functional hardware unit.

Example 40 is a machine-readable medium including code, when executed, to cause a machine to perform the method of any one of subject matter of Examples 12 to 18.

Example 41 is an apparatus including means for performing the method of any one of the subject matter of Examples 12 to 18.

Example 42 is an apparatus including a processor configured to perform the method of any one of the subject matter of Examples 12 to 18.

Example 43 is a method as in Example 12 including at least one of calculating a frequency ratio between the first frequency and the second frequency, where the frequency ratio is associated with a first number of instructions per cycle for the first functional hardware unit and a second number of instructions per cycle for the second functional hardware unit, where a first performance of the first functional hardware unit is the first frequency multiplied by a first number of instructions per a unit of time associated with the first functional hardware unit, where a second performance of the second functional hardware unit is the second frequency multiplied by a second number of instructions per a unit of time associated with the second functional hardware unit, and/or calculating a maximum frequency for the second functional hardware unit.

Example 44 is a machine-readable storage including machine-readable instructions, when executed, to implement a method or realize an apparatus as described in any preceding Example.

Example 45 is a system including a peripheral device, a power control unit (PCU), a first functional hardware unit coupled to the power control unit, and a second functional hardware unit coupled to the power control unit, where the first functional hardware unit and the second functional hardware unit are heterogeneous functional hardware units, where the PCU is configured to monitor at least one power attribute of the first and second functional hardware units, calculate an aggregate power value based on the monitored at least one power attribute, and upon determining that the aggregate power value is below a power threshold, calculate a first frequency for the first functional hardware unit and calculate a second frequency for the second functional hardware unit that results in an updated aggregate power value that is closer to the power threshold.

Example 46 is a system including a memory, a power control unit (PCU) coupled to the memory, a first functional hardware unit coupled to the power control unit, and a second functional hardware unit coupled to the power control unit, where the first functional hardware unit and the second functional hardware unit are heterogeneous functional hardware units, where the PCU is configured to monitor at least one power attribute of the first and second functional hardware units, calculate an aggregate power value based on the monitored at least one power attribute, and upon determining that the aggregate power value is below a power threshold, calculate a first frequency for the first functional hardware unit and calculate a second frequency for the second functional hardware unit that results in an updated aggregate power value that is closer to the power threshold.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present specification, a detailed description has been given with reference to specific example embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," "monitoring," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An integrated circuit comprising:
a power control unit (PCU);
a first functional hardware unit coupled to the PCU; and
a second functional hardware unit coupled to the PCU, wherein the first functional hardware unit and the second functional hardware unit are heterogeneous functional hardware units, wherein the PCU is to:
monitor at least one power attribute of the first and second functional hardware units, wherein the at least one power attribute comprises a frequency, voltage, or power consumption;
calculate an aggregate power value based on the monitored at least one power attribute;
determining a frequency ratio between the first functional hardware unit and the second functional hardware unit, wherein the frequency ratio is based on instructions-per-cycle associated with each of the first functional hardware unit and the second functional hardware unit;
upon determining that the aggregate power value is below a maximum power threshold and above a minimum power metric, calculate, based on the frequency ratio, a first frequency for the first functional hardware unit and a second frequency for the second functional hardware unit to produce an updated aggregate power value that is closer to the maximum power threshold and further from the minimum power metric, wherein the calculated first and the second frequencies are balanced according to the frequency ratio; and cause a first operating frequency of the first functional hardware unit to be adjusted to the first frequency and cause a second operating frequency of the second functional hardware unit to be adjusted to the second frequency, wherein the first and second frequencies are different.

2. The integrated circuit of claim 1, wherein the calculated first and second frequencies for each of the first functional hardware unit and the second functional hardware unit are to result in a same performance for the first functional hardware unit as a performance for the second functional hardware unit.

3. The integrated circuit of claim 1, wherein a first performance of the first functional hardware unit is the first frequency multiplied by a first number of instructions per a unit of time associated with the first functional hardware unit, wherein a second performance of the second functional hardware unit is the second frequency multiplied by a second number of instructions per a unit of time associated with the second functional hardware unit.

4. The integrated circuit of claim 1, wherein the at least one power attribute comprises a frequency, voltage, energy, or power consumption.

5. The integrated circuit of claim 1, wherein the second functional hardware unit is to handle fewer instructions per cycle than the first functional hardware unit, and wherein when calculating the first and second frequencies, the PCU is to calculate a maximum frequency for the second functional hardware unit.

6. The integrated circuit of claim 5, wherein the maximum power threshold is a power metric of the first functional hardware unit when the first functional hardware unit is for simultaneous multi-threading.

7. The integrated circuit of claim 5, wherein the first frequency is greater than 2.5 gigahertz.

8. The integrated circuit of claim 5, wherein the second frequency is at least ten percent greater than the first frequency.

9. The integrated circuit of claim 1, wherein the first functional hardware unit and the second functional hardware unit are to each simultaneously execute a plurality of threads.

10. A method comprising:
monitoring, by a power control unit (PCU), at least one power attribute of a first and a second functional hardware unit, wherein the first functional hardware unit and the second functional hardware unit are heterogeneous functional hardware units;
calculating an aggregate power value based on the monitored at least one power attribute, wherein the at least one power attribute comprises a frequency, voltage, or power consumption;
determining a frequency ratio between the first functional hardware unit and the second functional hardware unit, wherein the frequency ratio is based on instructions-per-cycle associated with each of the first functional hardware unit and the second functional hardware unit;
upon determining that the aggregate power value is below a maximum power threshold and above a minimum power metric, calculate, based on the frequency ratio, a first frequency for the first functional hardware unit and a second frequency for the second functional hardware unit to produce an updated aggregate power value that is closer to the maximum power threshold and further from the minimum power metric, wherein the calculated first and the second frequencies are balanced according to the frequency ratio; and causing a first operating frequency of the first functional hardware unit to be adjusted to the first frequency and cause a second operating frequency of the second functional hardware unit to be adjusted to the second frequency, wherein the first and second frequencies are different.

11. The method of claim 10, wherein the calculated first and second frequencies for each of the first functional hardware unit and the second functional hardware unit are to result in a same performance for the first functional hardware unit as a performance for the second functional hardware unit.

12. The method of claim 10, wherein a first performance of the first functional hardware unit is the first frequency multiplied by a first number of instructions per a unit of time associated with the first functional hardware unit, wherein a second performance of the second functional hardware unit is the second frequency multiplied by a second number of instructions per a unit of time associated with the second functional hardware unit.

13. The method of claim 10, wherein the at least one power attribute comprises a frequency, voltage, or power consumption.

14. The method of claim 10, wherein the second functional hardware unit is to handle fewer instructions per cycle than the first functional hardware unit, wherein the calculating the first and second frequencies comprises calculating a maximum frequency for the second functional hardware unit.

15. A non-transitory machine-readable storage medium including data that, when executed by a processor, cause the processor to:

monitor, by a power control unit (PCU), at least one power attribute of a first and a second functional hardware unit, wherein the first functional hardware unit and the second functional hardware unit are heterogeneous functional hardware units;

calculate an aggregate power value based on the monitored at least one power attribute, wherein the at least one power attribute comprises a frequency:

determine a frequency ratio between the first functional hardware unit and the second functional hardware unit, wherein the frequency ratio is based on instructions-per-cycle associated with each of the first functional hardware unit and the second functional hardware unit;

upon determining that the aggregate power value is below a maximum power threshold and above a minimum power metric, calculate, based on the frequency ratio, a first frequency for the first functional hardware unit and a second frequency for the second functional hardware unit to produce an updated aggregate power value that is closer to the maximum power threshold and further from the minimum power metric, wherein the calculated first and the second frequencies are balanced according to the frequency ratio; and cause a first operating frequency of the first functional hardware unit to be adjusted to the first frequency and cause a second operating frequency of the second functional hardware unit to be adjusted to the second frequency, wherein the first and second frequencies are different.

16. The non-transitory machine-readable storage medium of claim 15, wherein the calculated first and second frequencies are to result in a same performance for the first functional hardware unit as a performance for the second functional hardware unit.

17. The non-transitory machine-readable storage medium of claim 15, wherein a first performance of the first functional hardware unit is the first frequency multiplied by a first number of instructions per a unit of time associated with the first functional hardware unit, wherein a second performance of the second functional hardware unit is the second frequency multiplied by a second number of instructions per a unit of time associated with the second functional hardware unit.

18. The non-transitory machine-readable storage medium of claim 15, wherein the at least one power attribute comprises a frequency, voltage, or power consumption.

19. The non-transitory machine-readable storage medium of claim 15, wherein the second functional hardware unit is to handle fewer instructions per cycle than the first functional hardware unit, wherein the calculating the first and second frequencies comprises calculating a maximum frequency for the second functional hardware unit.

* * * * *